Feb. 27, 1962  C. S. WHITE  3,023,038
BALL STUD AND METHOD OF CONSTRUCTION
Filed May 27, 1957
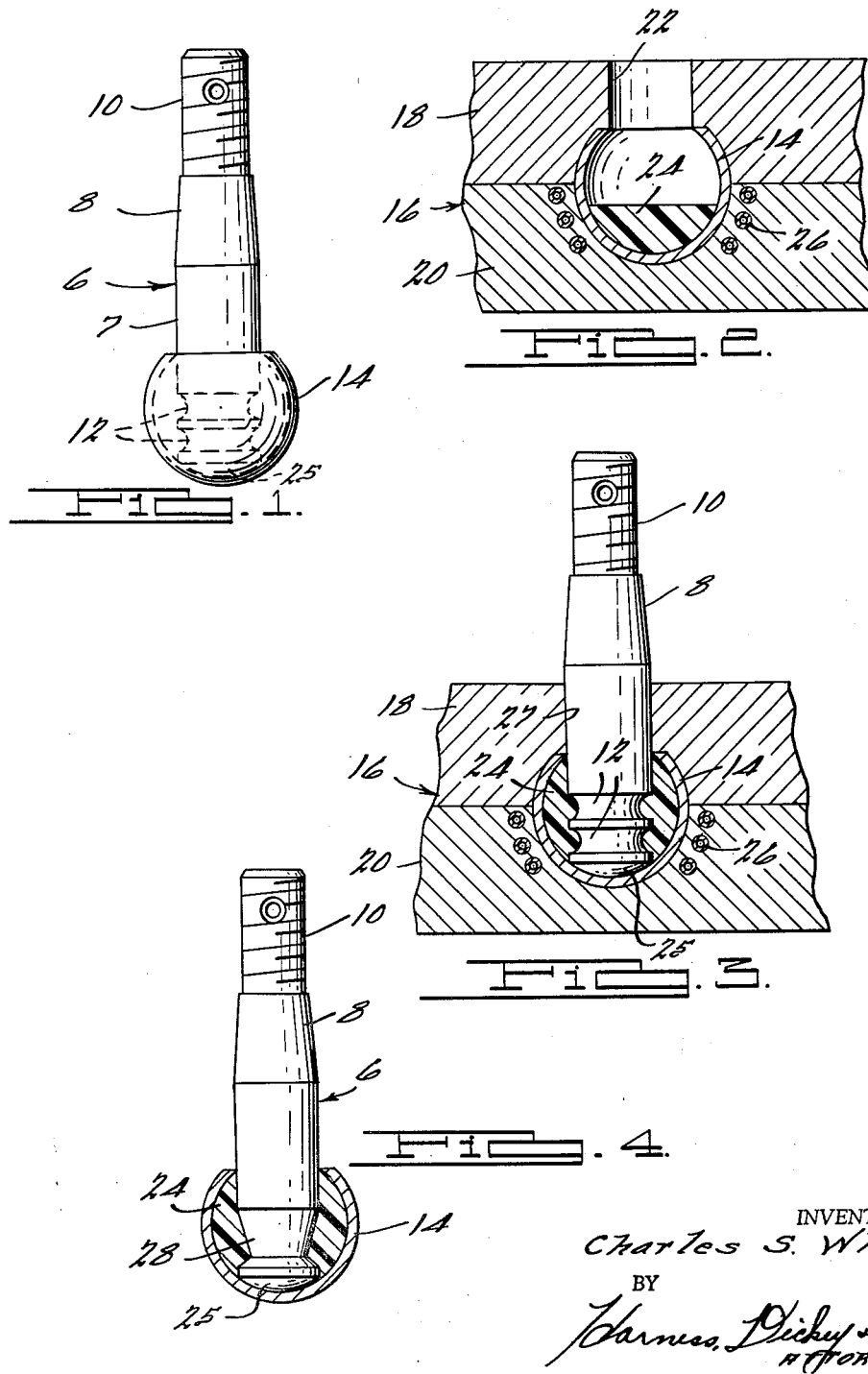
INVENTOR.
Charles S. White.
BY
Harness, Dickey & Pierce
ATTORNEYS.

United States Patent Office 3,023,038
Patented Feb. 27, 1962

3,023,038
BALL STUD AND METHOD OF CONSTRUCTION
Charles S. White, 30007 Lahser Road,
Birmingham, Mich.
Filed May 27, 1957, Ser. No. 661,892
2 Claims. (Cl. 287—87)

This invention relates to studs having enlarged balls on one end thereof, and more particularly to studs having sheet metal spherical shells mounted on one end thereof by means of a hardenable material.

In the past, machined studs having enlarged spherical heads on one end, such as kingpins, have been machined from forgings having the spherical head roughed out on one end, or machined from large studs having a diameter equal to the diameter of the enlarged spherical head. The latter method is extremely wasteful of material, and the former requires a relatively expensive forging.

This invention provides a stud having an enlarged spherical head which is produced by mounting a sheet metal spherical shell securely on the end of the stud by means of a hardenable material. This is accomplished by depositing a predetermined amount of hardenable material inside the spherical shell through a suitable aperture in the wall thereof, and forcing one end of the stud into the shell to displace the hardenable plastic so that it completely fills the space between the shell and the portion of the stud disposed within the shell. After the material hardens, the spherical shell is rigidly secured on the end of the stud, and for all intents and purposes is substantially equivalent to a similar article produced by machining a forging or a stud of enlarged diameter.

It is one object of the invention to provide a shaft having a spherical shell rigidly mounted on one end thereof by a hardenable material.

It is another object of the invention to provide a simple and inexpensive method for securely mounting a spherical shell on the end of a shaft.

It is a further object of the invention to provide a stud having an enlarged ball on one end thereof which is rugged in construction, inexpensive to manufacture, and durable in use.

Other objects and features of novelty will become apparent when referring, for a better understanding of the invention, to the following description taken in conjunction with the accompanying drawing, wherein:

FIGURE 1 is an elevational view of a stud having a spherical head embodying features of the invention;

FIG. 2 is a sectional view of a split die having a sheet metal spherical shell disposed therein with hardenable plastic material disposed within the shell;

FIG. 3 is a sectional view of the split die and sheet metal shell illustrated in FIG. 2 with a stud inserted therein in accordance with the invention; and FIG. 4 is an elevational view of another modification of a stud having a spherical head embodying features of the invention.

Referring to FIG. 1, a preferred embodiment of the invention is illustrated comprising a machined stud 6 having a cylindrical portion 7, a tapered portion 8, a threaded end 10, and annular grooves 12 on the other end thereof, with a sheet metal spherical shell 14 securely mounted on said other end. To attach the spherical shell 14 to the shaft 6, the shell 14 is disposed within a split die 16, as illustrated in FIGS. 2 and 3, having an upper die 18 with an aperture 22 therein, and a lower die 20. A predetermined amount of hardenable material 24 is disposed within the spherical shell 14 slightly in excess of that required to completely fill the space within the shell when the stud is positioned therein. Heating elements 26 may be provided in the lower die 20 to cure the material 24 while under pressure if it is thermosetting or to make the material workable if it is thermoplastic.

The end of the stud 6 having the annular grooves 12 is then inserted through the aperture 22 in the upper die, and displaces the material 24 under pressure because of the aforesaid slightly excessive amount so that it completely fills the space between the shaft 6 and the spherical shell 14, as illustrated in FIG. 3. The clearance between the stud 6 and the aperture 22 permits trapped air to escape as the stud 6 is forced downwardly into the spherical shell 14, but prevents the escape of the hardenable material even though the material is under pressure which is desirable.

After the material 24 hardens, the stud and shell are removed from the split die 16 as an integral unit which for all intents and purposes is substantially the same as a stud and ball formed by conventional methods.

The hardenable material 24 not only serves as a convenient means for rigidly securing the spherical shell 14 to the end of the shaft 6, but also provides a backing for the shell which is capable of withstanding great compressive forces. Various types of hardenable material are suitable for the purposes of the invention, and it is not intended that the invention be limited in any way by the particular material employed. By way of example only, certain resins procurable in the trade may be employed as the hardenable material, such as polyethylene molding compounds, two being procurable on the market, one under the name of Super-dyland, the other under the name of Marlex; phenolic impregnated glass fibrous material procurable in the trade under the name of Durez; and a form of nylon material procurable on the market under the name of Zytel.

As illustrated in FIG. 4, the grooves 12 may be replaced by a V-shaped groove 28 which serves the same function as the annular grooves 12 in that it prevents the longitudinal displacement of the spherical shell 14 relative to the stud 6. It will also be observed that the end 25 of the stud 6 is dome shaped to provide a smooth surface contact with the interior of the shell 14. Also, the surface of the cylindrical portion of the stud encased by the hardenable material 24 is preferably roughened or otherwise deformed or machined to prevent rotation of the hardenable material relative to the stud.

The spherical shell 14 may be easily produced by inserting a cylindrical shell having a closed end through the aperture 22 and into the split die 16. A flexible air bag (not shown) may then be inserted into the cylindrical shell, and compressed air introduced into the bag to force the shell outwardly against the spherical walls of the die 16 until it assumes the shape and position of the spherical shell 14 illustrated in FIG. 2. It is apparent that the air pressure will cause the bag to exert an even pressure over the entire inner surface of the spherical shell 14 so that it will conform perfectly with the spherical recess in the split die 16.

From the above description it is clear that the spherical shell can be rapidly and inexpensively produced by utilizing the same die used for mounting the shell on the end of the stud 6. Once the shell is expanded into shape, the hardenable material and stud may be inserted in accordance with the invention to produce a stud and ball that is obviously more simple and less expensive to manufacture, and yet useful for substantially all of the applications of a conventional solid metal stud and ball.

What is claimed is:

1. A ball stud adapted to cooperate with a socket to form a ball joint comprising, a stud having a dome shaped end and an annular groove adjacent said end, an enlarged sheet metal spherical shell disposed over said end of the stud with a portion of the inner surface thereof abuttingly engaging said dome shaped end, and hardened material completely filling the space between said shell and stud for rigidly securing the shell to the stud.

2. The invention as defined in claim 1 wherein the curvature of said dome-shaped end is substantially the same as the curvature of the inner surface of said spherical shell.

References Cited in the file of this patent

UNITED STATES PATENTS

| | | |
|---|---|---|
| Re. 18,843 | Skillman | May 30, 1933 |
| 464,371 | Kimble | Dec. 1, 1891 |
| 679,522 | Wassel | July 30, 1901 |
| 941,032 | McCarthy | Nov. 23, 1909 |
| 1,074,461 | Rachliss | Sept. 30, 1913 |
| 1,609,724 | Kendall | Dec. 7, 1926 |
| 1,983,947 | Rockwell | Dec. 11, 1934 |
| 2,631,488 | Tansey | Mar. 17, 1953 |
| 2,660,083 | Tyson | Nov. 24, 1953 |
| 2,694,228 | Mathis | Nov. 16, 1954 |
| 2,768,848 | Mitchell et al. | Oct. 30, 1956 |